United States Patent
Stienhans

(10) Patent No.: US 8,694,596 B2
(45) Date of Patent: Apr. 8, 2014

(54) SYSTEMS AND METHODS FOR INFORMATION BROKERING IN SOFTWARE MANAGEMENT

(75) Inventor: Frank Stienhans, Mannheim (DE)

(73) Assignee: SAP AG, Walldorf (DE)

( * ) Notice: Subject to any disclaimer, the term of this patent is extended or adjusted under 35 U.S.C. 154(b) by 1652 days.

(21) Appl. No.: 11/235,506

(22) Filed: Sep. 27, 2005

(65) Prior Publication Data

US 2007/0074164 A1     Mar. 29, 2007

(51) Int. Cl.
*G06F 15/16*     (2006.01)
*G06F 15/167*    (2006.01)
*G06F 9/44*      (2006.01)

(52) U.S. Cl.
USPC .......... 709/213; 709/204; 709/217; 717/120; 717/131; 717/127

(58) Field of Classification Search
USPC ........................................ 709/213
See application file for complete search history.

(56) References Cited

U.S. PATENT DOCUMENTS

| | | | | |
|---|---|---|---|---|
| 5,664,182 A | * | 9/1997 | Nierenberg et al. | 707/102 |
| 6,163,859 A | * | 12/2000 | Lee et al. | 714/38 |
| 6,609,123 B1 | * | 8/2003 | Cazemier et al. | 707/4 |
| 6,760,734 B1 | * | 7/2004 | Stephens | 707/102 |
| 7,085,825 B1 | * | 8/2006 | Pishevar et al. | 709/221 |
| 7,350,191 B1 | * | 3/2008 | Kompella et al. | 717/108 |
| 2002/0103818 A1 | * | 8/2002 | Amberden | 707/205 |
| 2004/0068714 A1 | * | 4/2004 | Deimel et al. | 717/101 |
| 2004/0111728 A1 | * | 6/2004 | Schwalm | 719/316 |

* cited by examiner

*Primary Examiner* — Noel Beharry
(74) *Attorney, Agent, or Firm* — Finnegan, Henderson, Farabow, Garrett & Dunner, LLP

(57) ABSTRACT

Methods and systems consistent with embodiments of the present invention may provide an interface configured to obtain software management information from software applications under management, and provide a central information broker having the software management information.

24 Claims, 4 Drawing Sheets

SYSTEMS AND METHODS FOR INFORMATION BROKERING IN SOFTWARE MANAGEMENT

BACKGROUND

1. Technical Field

The present invention relates generally to software systems, and, more specifically to systems and methods for brokering information in software management.

2. Related Art

As software solutions become more complex, the number of software applications and components in the solution increases. There may be many dependencies between the software applications and components, and different portions of the software may need to convey data to other portions. Much of this data may be similar, but the data may be stored in different locations and formats, and accessed in different ways. For example, each software application may use a different interface to transfer data from and to other applications. This may lead to a complex architecture that is difficult to manage.

Accordingly, it would be beneficial to provide a system and method for information brokering in software management.

SUMMARY OF THE INVENTION

A method for managing software consistent with the invention comprises providing a central information broker to store software management information regarding a plurality of software managed by information providers; configuring the central information broker to automatically obtain desired software management information from the information providers; and providing, to information consumers, the software management information stored in the central information broker.

A central information broker consistent with the invention for managing software comprises a storage portion with software management information regarding a plurality of software managed by information providers; an information gathering portion to automatically obtain desired software management information from the information providers; and an interface to allow information consumers to receive the software management information stored in the central information broker.

A system for managing software consistent with the invention comprises information consumers; information providers running application programs; and a central information broker automatically obtaining software management information regarding the application programs running in the information providers, storing the software management information, and providing the software management information to the information consumers.

Both the foregoing general description and the following detailed description are exemplary and explanatory only, and should not be considered restrictive of the scope of the invention, as described and claimed. Features and/or variations may be provided in addition to those set forth herein.

BRIEF DESCRIPTION OF THE DRAWINGS

The accompanying drawings, which are incorporated in and constitute a part of this specification, illustrate several embodiments of the invention and together with the description, serve to explain principles of the invention. In the drawings.

DETAILED DESCRIPTION

Figure 1:
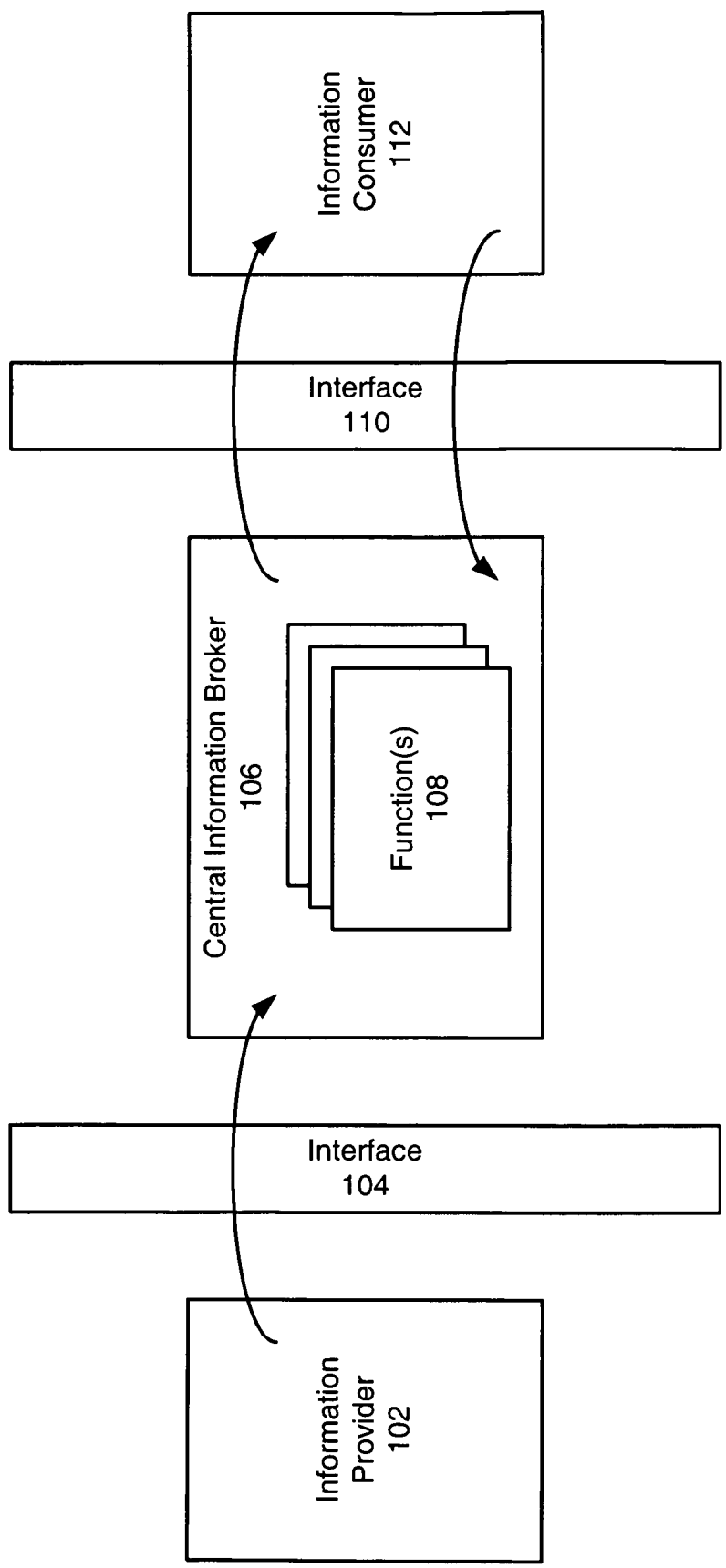
FIG. 1 is a block diagram of a software management system consistent with the invention.

The following detailed description refers to the accompanying drawings. Wherever possible, the same reference numbers in the drawings and the description refer to the same or similar parts. Although the following description identifies several features and implementations of the invention, those implementations are exemplary only, and may be modified without departing from the spirit and scope of the invention. The appended claims define the proper scope of the invention.

As discussed herein, software management is the administration, configuration, development, or any other handling of software. Software includes software applications, such as programs, program components, application components, executable code, computer instructions, computer data, electronic data, or any other type of data that can be received or stored. Software management may include configuring, monitoring, developing, modifying, or running software. Software management may also include managing hardware in association with software. Hardware may include any electronics-related, computer-related, or other types of devices capable of receiving, storing, executing, developing, using, or handling software.

As shown in FIG. 1, exemplary software management systems consistent with the invention may include information providers 102, which are software applications under software management and may include applications on a specific platform. The platform may be a complex application and development environment, and may reflect the requirements for building and running business applications for companies of various sizes, such as mid- to large-size companies. For example, information providers 102 may include Net Weaver-based applications on a Net Weaver platform from SAP, Inc. in Walldorf, Germany.

Significant amounts of software management data may be required to manage information providers 102. Software management data may include configuration data, such as authorization data, system landscape data, performance statistic data, user statistic data, licensing data, error analysis data, intruder detection data, software patch planning data, configuration portal data, software solution execution overview data, service level agreement overview data, and any other data facilitating software management. Software solution execution overview data may include data on software applications involved in the software solution and/or data on identity of users using the software solution. Service level agreement overview data may include data on how a system setup or software solution achieves the objectives of in service level agreements.

The software management data may be stored as metadata in information providers 102. Metadata is data stored in software to help facilitate management of the software. Metadata may include data in software applications or portions of software applications that specify relationships between the software applications or portions of the software applications. Metadata may also provide an infrastructure within software to illustrate the dependencies across an entire software solution and may specify how different pieces of the software solution interact with each other. A software solution may include multiple software applications with interrelated software that rely on each other's services and functions.

For example, metadata may include monitoring data, static data, personalized data, usage data, or any other software management data. Static data may include, for example, a column of data in a table, that is hidden by a user of a software application. Usage data may include data created and stored during software use. For instance, a request by a software application to use a web service may create usage data about the identity of a user making the request, the location of the client machine calling the web service, the time of the request, the parameters of the call, the result of the call, and any error data generated from the call. After the web service responds to the request, the web service or software application may no longer be interested in this metadata, but other parties may find great value in the metadata. For instance, software managers may wish to analyze security, performance, system load, system landscape, etc. using the metadata, or a consultant may wish to use the metadata to debug an error or customize the software application and overall software solution.

Typically, software management data is stored in information providers 102 at different locations and in different formats, and may be accessed via different mechanisms. Different applications and components may require similar software management data. For example, authorization data for users is required by user administration applications as well as applications that perform active security checks. In Net Weaver, web service monitoring data in Net Weaver's Exchange Infrastructure (XI) application may overlap monitoring data in Net Weaver's Computer Center Monitoring System (CCMS). Hence, the Net Weaver applications may send similar software management data to different applications and components via different adapters for each target application and component. The adapters may use different protocols, such as RFC, HTTP, or Web services, to transport the software management data. These adapters and inhomogeneous dependencies between the applications may make it difficult to manage the applications.

As shown in FIG. 1, systems consistent with the present invention may provide an interface 104 configured to obtain software management information from information providers 102. Interface 104 may provide a single adapter for obtaining information from information providers 102, and may include software and/or hardware for obtaining the software management information. Interface 104 may obtain software management information from information providers 102 in any form (e.g., parameters, information sequence, etc.). Interface 104 may be a generic interface that serializes parameters and a method name to XML, and sends the XML document to information providers 102 via RPC, RFC, email, or other mechanism. The manner in which interface 104 obtains software management information from information providers 102 may depend upon the criticality of the information. For instance, some software management information may be needed immediately (e.g., real time updates) and other software management information may be needed less urgently (e.g., usage statistics for later analysis).

By way of example, in some implementations, a method to obtain and publish software management information from information providers 102 may look like this: "InfoProvider::publish(Object caller, DateTime data_of_issue, String user_ID, String used_method_parameter1, Exception error_occurred)." A call to the method may look, for example, like this: "infoProvider.publish(this, now( ), userID, param1, null) ."

Interface 104 may obtain software management information from information providers 102 by converting software management data from information providers 102 into the software management information. For example, interface 104 may process metadata to extract software management information, compare similar software management information from various information providers 102 to check the software management information, and remove redundant information or perform any other operations to obtain the software management information. Alternatively, central information broker 106 (described below) may share in performing some of these functions.

Systems consistent with the present invention may provide a central information broker 106. Central information broker 106 may store software management information obtained via interface 104 from information providers 102, and act as a repository and a source for software management information. Central information broker 106 may include software and/or hardware to read data from information providers 102 and store software management information in central information broker 106. For example, central information broker 106 may be implemented as a business intelligence (BI) application component in Net Weaver. The BI application component may receive software management information from multiple information providers 102, store the software management information, and provide the software management information to multiple consumers.

Systems consistent with the present invention may receive a request for select software management information, which may be in the form of some type of an attempt to obtain or call for software management information. Central information broker 106 may receive the request for select software management information via interface 110 from information consumers 112, and process the request. Interface 110 may include a single adapter for providing software management information to information consumers 112, and include software and/or hardware to provide the software management information. Information consumers 112 can be any software applications that use software management information provided by central information broker 106. In fact, information consumers 112 may be information providers 102 and vice versa.

For example, a BI application component may receive a request from a user administration tool for system management information, such as user authorization information. The BI application component may parse the request, and search its records for the requested system management information. The user administration tool may use the requested system management information from the BI application component.

Systems consistent with the present invention may provide a representation of select software management information, in response to a received request. Select software management information is a desired subset or portion of software management information in a received request. A representation of select software management information is information, in any form, reflecting or conveying the software management information that is asked for in a received request. The representation may be textual, graphical, encoded, or another format.

As shown in FIG. 1, central information broker 106 may provide the representation of select software management information. Central information broker 106 may have already analyzed data from information providers 102 to generate the representation, and hence, may not need to generate the representation. For example, a BI application component may receive a request for system landscape information. However, multiple software applications may need system landscape information. Hence, the BI application component may have generated the system landscape information by automatically analyzing system data obtained via interface 104 from information providers 102, and may provide the generated information in response to the request.

Systems consistent with the present invention may graph a representation of select software management information in response to a received request. Central information broker 106 may include various functions 108 to analyze the software management information and functions 108 may include graph functions to graph or present the representation in a useful format. For example, a BI application component in Net Weaver has many analysis, graphing, and table functions. Hence, it would be efficient to use or adapt existing functions in the BI application component, which is designed to present information in useful formats, to graph and analyze software management information for applications under software management.

Figure 2:
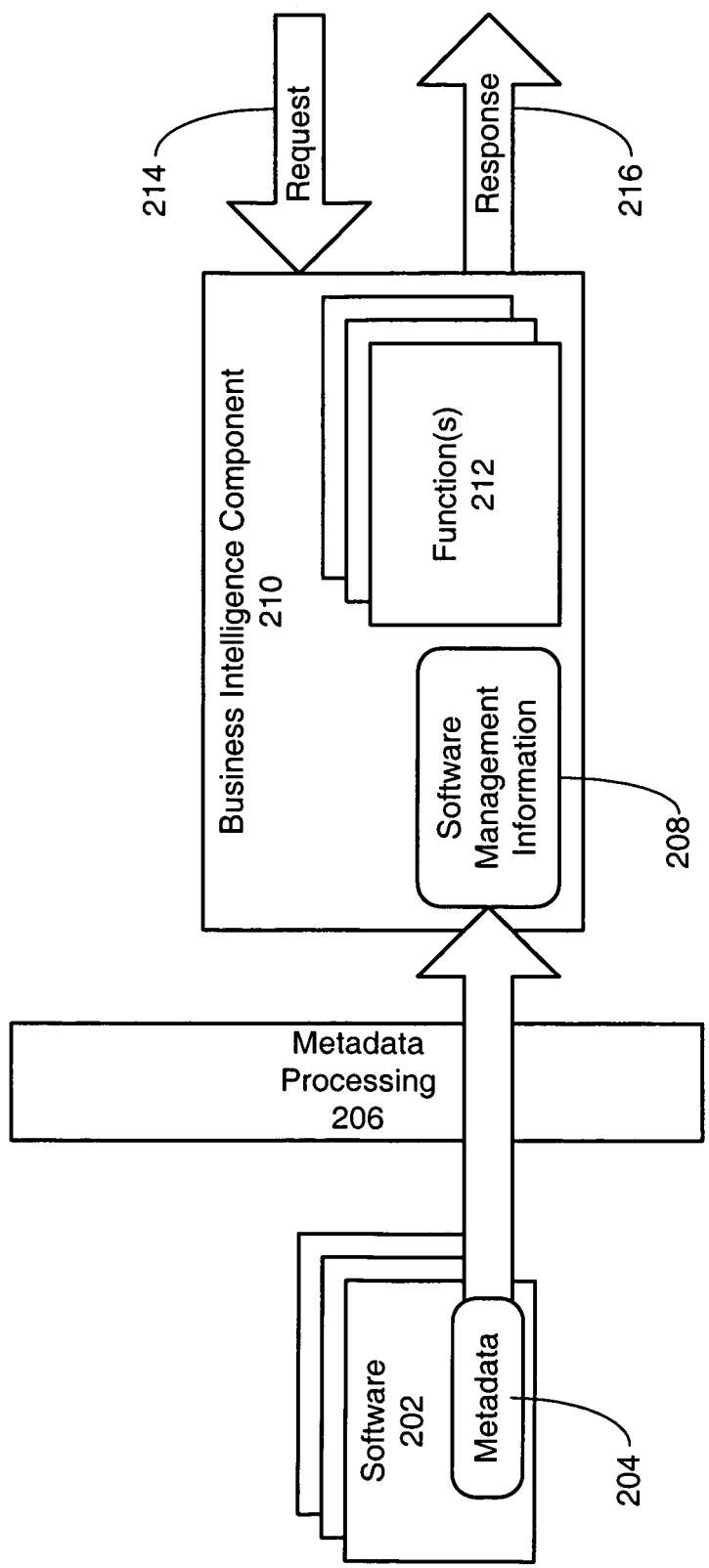
FIG. 2 is a data flow diagram for a software management system consistent with the invention.

FIG. 2 is a data flow diagram 200 for a software management system consistent with the invention. As shown in FIG. 2, each piece of software 202 may include metadata 204. Metadata 204 contains information for managing software 202 and may undergo metadata processing 206 to provide software management information 208 from software 202. Each piece of software 202 may only require a single interface to provide metadata 204 for metadata processing 206. Hence, each piece of software 202 does not need to maintain multiple interfaces and adapters to provide metadata 204 to multiple consumers, respectively. Business intelligence component 210 is a central information broker.

Business intelligence component 210 includes processing and graphing functions 212 and may further process and store software management information 208 according to received requests 214. In response to requests 214, business intelligence component 210 may generate a representation of select software management information form software management information 208 and may graph the representation using functions 212.

In one embodiment consistent with the invention, a software management system may include a component for obtaining software management information from software applications under management. The system may also include a component for storing software management information, receiving a request for select software management information, providing a representation of select software management information in response to the request, and graphing the representation in response to the request. These components may be implemented in a system such as system 302 of FIG. 3. Any suitable combination of hardware, software, and/or firmware may be used to implement the components. The hardware, software, and/or firmware may include processors, memory, storage devices, computer-readable mediums, external communication devices, internal communication devices, display devices, input devices, output devices, etc. The aforementioned system 302 is exemplary and other systems may include the components.

Figure 3:
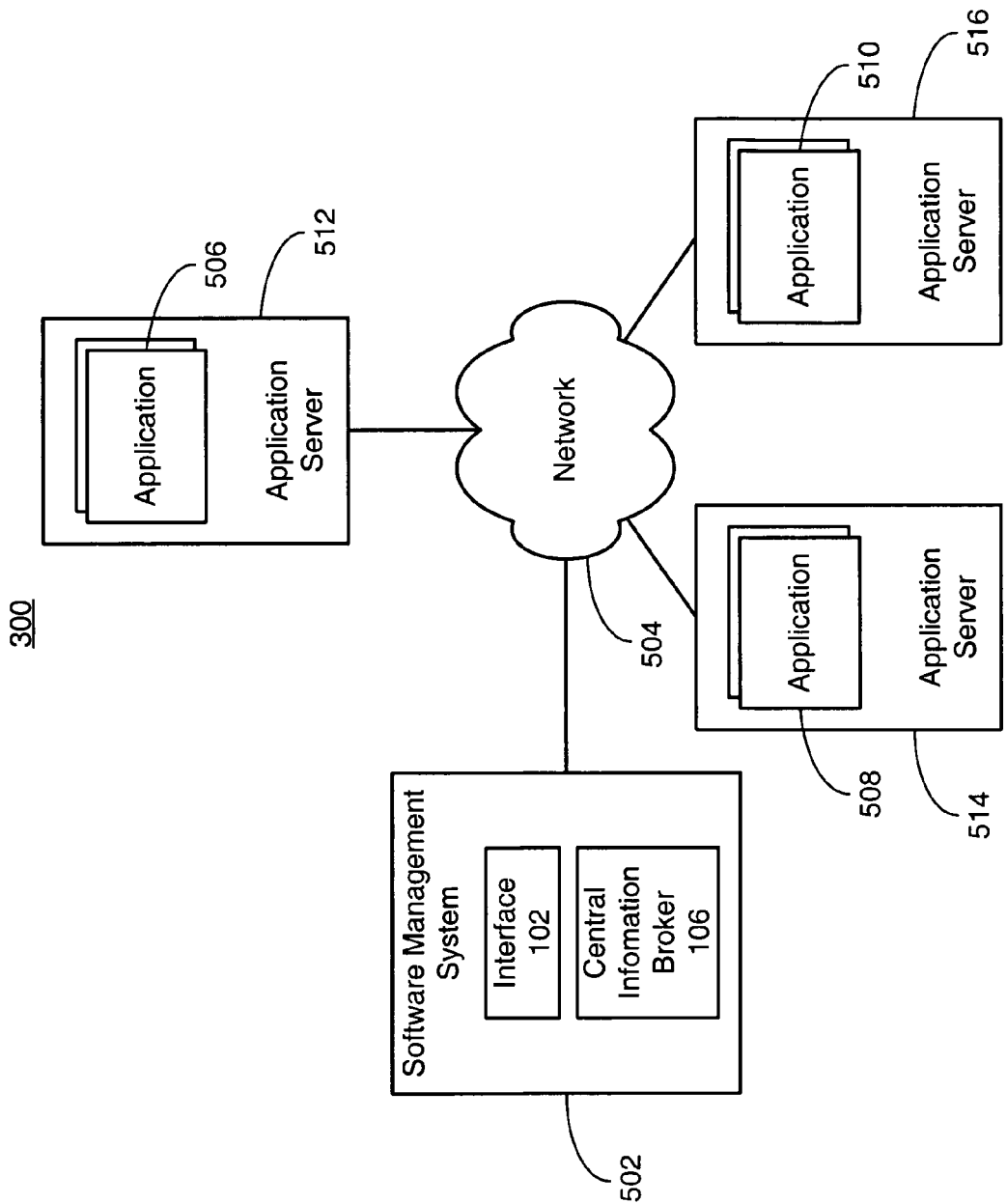
FIG. 3 is a block diagram containing a software management system consistent with the invention.

By way of example, FIG. 3 illustrates a block diagram 300 containing a software management system consistent with the invention. A software manager may use software management system 302 to manage software applications over a network 304. The software applications may include applications 306-310, which may run on single or multiple servers, such as applications servers 312-316. Users may access and use applications on servers 312-316 over network 504. Software management system 302 may contain software management information obtained from software applications 306-310 via interface 102 over network 304. A software manager and/or software applications 306-310 may access software management information stored in central information broker 106.

Figure 4:
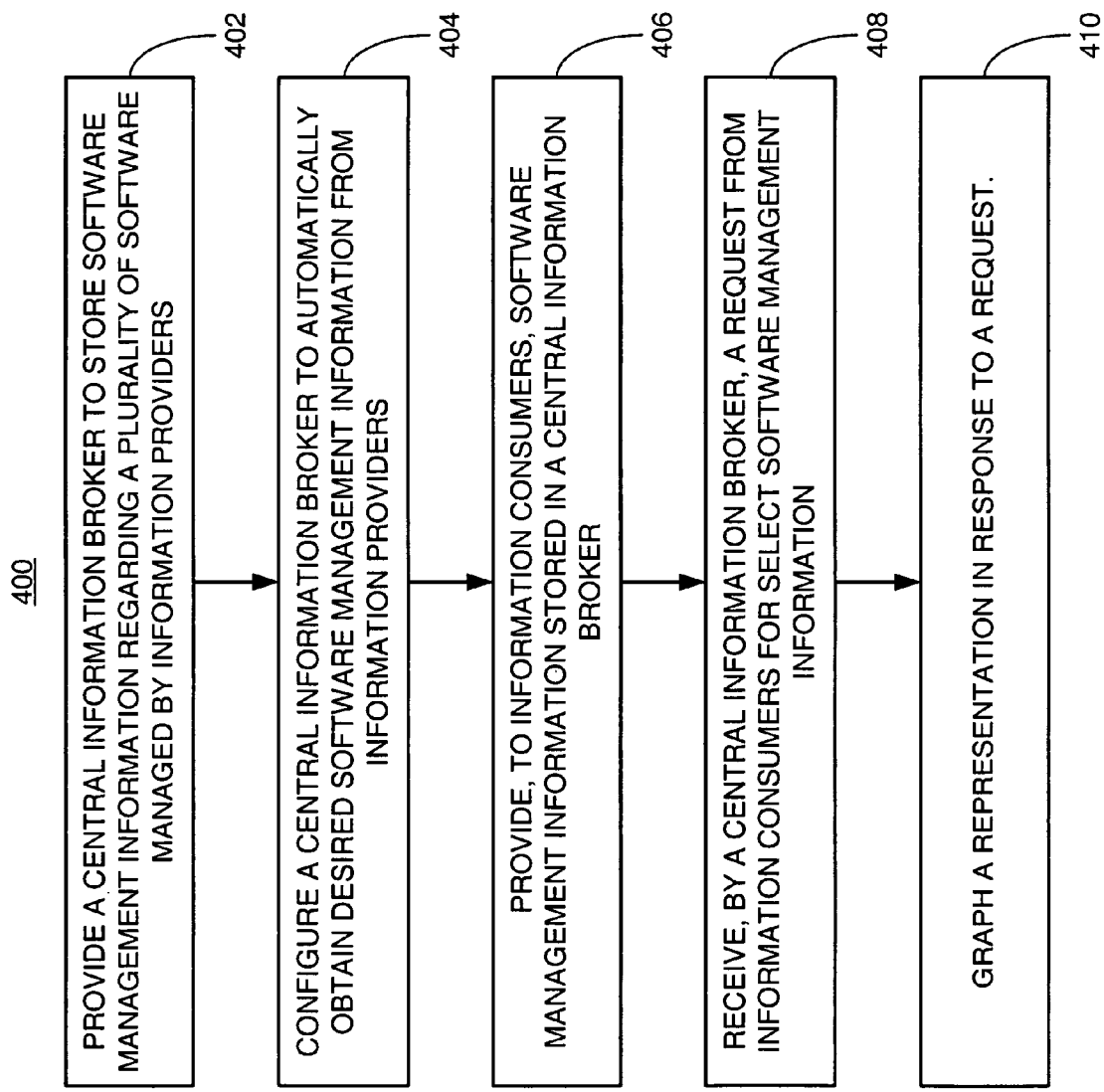
FIG. 4 is a flow chart of a method for managing software consistent with the invention.

Software management system 302 may perform a software management method 400, consistent with the invention, illustrated in FIG. 4. System 302 may include a processor, memory, and/or other components configured to implement method 400. For example, system 302 may provide a central information broker 106 to store software management information regarding a plurality of software managed by information providers, such as applications 306-310 (Block 402). System 302 may configure central information broker 106 to automatically obtain desired software management information from information providers, such as applications 306-310 (Block 404). System 302 may provide software management information stored in central information broker 106 to information consumers, such as applications 306-310 (Block 406). Central information broker 106 may receive a request from information consumers for select software management information (Block 408). Central information broker 106 may graph the representation in response to the request (Block 410).

The foregoing disclosure only describes some of the features and embodiments of the invention. Those skilled in the art, however, will understand other features and embodiments from consideration of the specification and practice of the embodiments of the invention disclosed herein. For example, although the described embodiments use data stored in memory and other storage media, one skilled in the art will appreciate that other types of computer-readable media, such as secondary storage devices, like hard disks, floppy disks, or a CD-ROM, or other forms of RAM or ROM, can contain the data. Further, the steps of the disclosed methods may be modified in any manner, including by reordering steps and/or inserting or deleting steps, without departing from the principles of the invention. The specification and examples are thus only exemplary only, as the following claims and their equivalents set forth the scope of the invention.

What is claimed is:

1. A method for managing software, comprising:
    storing, in a central information broker, management information regarding a plurality of software managed by information providers;
    configuring the central information broker to automatically obtain software management information from the information providers, the software management information being stored by the central information broker, the configuring comprising:
    receiving software management data from the information providers, the software management data being associated with the plurality of software;
    extracting the software management information from the received software management data; and
    processing the extracted software management information to remove redundant information;
    selecting, based on a system landscape information request, one or more subsets of the stored software management information, the selected subsets comprising system landscape information derived from the software management data received from the information providers;
    generating representations associated with the one or more selected subsets of stored software information; and
    receiving, at the central information broker, a request for a subset of software management information from an information consumer;

providing, to the information consumer, a generated representation associated with the requested subset, wherein the requested subset of software management information corresponds to the selected subset of stored software management information associated with the generated representation.

2. The method of claim 1, wherein the generating comprises:
graphing the representations associated with the one or more selected subsets.

3. The method of claim 1, wherein the configuring comprises configuring an interface to receive the software management data from the information providers, the software management data comprising metadata associated with the plurality of software.

4. The method of claim 1, wherein:
the software management data comprises metadata associated with the plurality of software; and
the configuring further comprises converting the metadata into the software management information.

5. The method of claim 1, wherein the central information broker is a business intelligence software component.

6. The method of claim 1, wherein the software management information includes configuration data.

7. The method of claim 1, further comprising:
storing the one or more generated representations of the software management information in the central information broker.

8. The method of claim 1, further comprising:
determining, in response to the request for a subset of software management information, whether the requested subset of software information corresponds to at least one of the selected subsets of software information; and
generating the representation associated with the requested subset, when the requested subset fails to corresponds to the at least one of the selected subsets.

9. A system, comprising:
a computer configured to execute instructions for managing software, the computer comprising:
a storage module configured to store software management information regarding a plurality of software managed by information providers;
an information gathering module configured to automatically obtain software management information from the information providers, the software management information being stored by the storage module, the information gathering module being further configured to:
receive software management data from the information providers, the software management data being associated with the plurality of software;
extract the software management information from the received software management data; and
process the extracted software management information to remove redundant information;
a module configured to select, based on a system landscape information request, one or more subsets of the stored software management information, the selected subsets comprising system landscape information derived from the software management data received from the information providers;
a module configured to generate representations associated with the one or more selected subsets of stored software information;

a module configured to receive a request for a subset of software management information from an information consumer; and
an interface configured to provide, to the information consumer, a generated representation associated with the requested subset, wherein the requested subset of software management information corresponds to the selected subset of stored software management information associated with the generated representation.

10. The system of claim 9, wherein the software management data comprises metadata associated with the plurality of software.

11. The system of claim 9, wherein:
the software management data comprises metadata associated with the plurality of software to the software; and
the information gathering module is further configured to convert the metadata into the software management information.

12. The system of claim 9, wherein the storage module, the information gathering module, and the interface comprise a business intelligence software component.

13. The system of claim 9, wherein the software management information includes configuration data.

14. The system of claim 9, wherein the module configured to generate is further configured to graph the representations associated with the one or more selected subsets.

15. The system of claim 9, further comprising:
a module configured to store the generated representations of the software management information in the storage module.

16. The system of claim 9, wherein the module configured to generate is further configured to:
determine, in response to the request for a subset of software management information, whether the requested subset of software information corresponds to at least one of the selected subsets of software information; and
generate the representation associated with the requested subset, when the requested subset fails to corresponds to the at least one of the selected subsets.

17. A system for managing software, comprising:
a storage device storing a program executable by a processor; and
a processor coupled to the storage device and executing the program to:
obtain software management data regarding one or more application programs run by information providers;
extract software management information from the obtained software management data;
process the extracted software management information to remove redundant information;
store the processed software management information;
selecting, based on a system landscape information request, one or more subsets of the stored software management information, the selected subsets comprising system landscape information generated by automatically analyzing the software management data received from the information providers;
generate representations associated with the one or more selected subsets of stored software information;
receive a request for a subset of software management information from an information consumer; and
provide, to the information consumer, a generated representation associated with the requested subset, wherein the requested subset of software management information corresponds to the selected subset of stored software management information associated with the generated representation.

18. The system of claim 17, wherein the processor executed to generate the representations is further executed to graph the representations associated with the one or more selected subsets.

19. The system of claim 17, wherein the processor further executes the program to:
- store the generated representations of the software management information.

20. The system of claim 17, wherein the processor further executes the program to:
- determine, in response to the received request, whether the requested subset of software information corresponds to at least one of the selected subsets of software information; and
- generate the representation associated with the requested subset, when the requested subset fails to corresponds to the at least one of the selected subsets.

21. A computer-readable medium storing instructions that, when executed by a processor, implement a method comprising:
- obtaining software management data from software applications under management;
- extracting software management information from the obtained software management data;
- processing the extracted software management information to remove redundant information;
- storing the processed software management information in a central information broker;
- selecting, based on a system landscape information request, one or more subsets of the stored software management information, the selected subsets comprising system landscape information derived from the software management data received from the information providers;
- generating representations associated with the one or more selected subsets of stored software information;
- receiving a request for a subset of software management information from an information consumer; and
- providing, to the information consumer, a generated representation associated with the requested subset, wherein the requested subset of software management information corresponds to the selected subset of stored software management information associated with the generated representation.

22. The computer-readable medium of claim 21, wherein the generating comprises:
- graphing the representations associated with the one or more selected subsets.

23. The computer-readable medium of claim 21, wherein the method further comprises:
- storing the generated representations of the software management information in the central information broker.

24. The computer-readable medium of claim 21, wherein the method further comprises:
- determining, in response to the received request, whether the requested subset of software information corresponds to at least one of the selected subsets of software information; and
- generating the representation associated with the requested subset, when the requested subset fails to corresponds to the at least one of the selected subsets.

* * * * *